United States Patent [19]

DeViaris

[11] Patent Number: 4,550,663
[45] Date of Patent: Nov. 5, 1985

[54] TRANSPORTATION SYSTEM HAVING A CABLE DRAWN VEHICLE

[75] Inventor: Guy DeViaris, Neuilly, France

[73] Assignee: Otis Elevator Company, Farmington, Conn.

[21] Appl. No.: 584,069

[22] Filed: Feb. 27, 1984

Related U.S. Application Data

[63] Continuation of Ser. No. 349,890, Feb. 18, 1982, abandoned.

[30] Foreign Application Priority Data

Feb. 27, 1981 [FR] France .................................. 81 03998

[51] Int. Cl.[4] ............................................. B61C 11/02
[52] U.S. Cl. ................................. 104/119; 104/23 FS; 104/189; 104/173 R
[58] Field of Search .................. 104/23, 23 FS, 23 R, 104/174–175, 178, 184, 185, 187, 189, 192, 197, 190, 191, 119, 173 ST, 240, 173 R; 105/3, 144

[56] References Cited

U.S. PATENT DOCUMENTS

| 406,302 | 7/1889 | Pendleton et al. | 104/192 |
| 1,229,465 | 6/1917 | Hudson | 105/3 |
| 2,677,331 | 5/1954 | Hauseman | 104/173 SI X |
| 3,588,049 | 6/1971 | Nectoux | 104/173 R |
| 3,675,583 | 7/1972 | Sobey et al. | 104/23 FS |
| 3,722,424 | 3/1973 | Van Veldhuizen | 104/23 FS |
| 3,820,467 | 6/1974 | Burdick | 104/23 FS |
| 4,188,018 | 2/1980 | Pasanen | 104/173 R |
| 4,327,647 | 5/1982 | Eisenkolb | 104/184 |
| 4,421,339 | 12/1983 | Hagin | 105/3 X |

FOREIGN PATENT DOCUMENTS

703436 12/1979 U.S.S.R. ................................ 105/3

Primary Examiner—Robert B. Reeves
Assistant Examiner—Glenn B. Foster
Attorney, Agent, or Firm—Robert E. Greenstien; Gerald E. Linden

[57] ABSTRACT

A passenger carrying vehicle, supported on air cushions in a guideway, is propelled back and forth in that guideway by a cable. A motor is at one end of the guideway and pulls the cable. The cable is part of a closed loop, having two parts, that extend along the same side of the guideway. Rollers, positioned along that side of the guideway, support each length of the cable. In curved portions of the guideway, where the vehicle is turned left or right, the roller that supports that length to which the car is attached is oriented to support the combined horizontal and vertical loads on the cable as the car is pulled around the turn. The vehicle comprises two cabs. These cabs are pivotally interconnected, allowing them to flex or pivot vertically relative to each other and allowing the vehicle to conform to variations in the contour of the guideway, thereby improving the lift characteristics of the air cushions.

1 Claim, 6 Drawing Figures

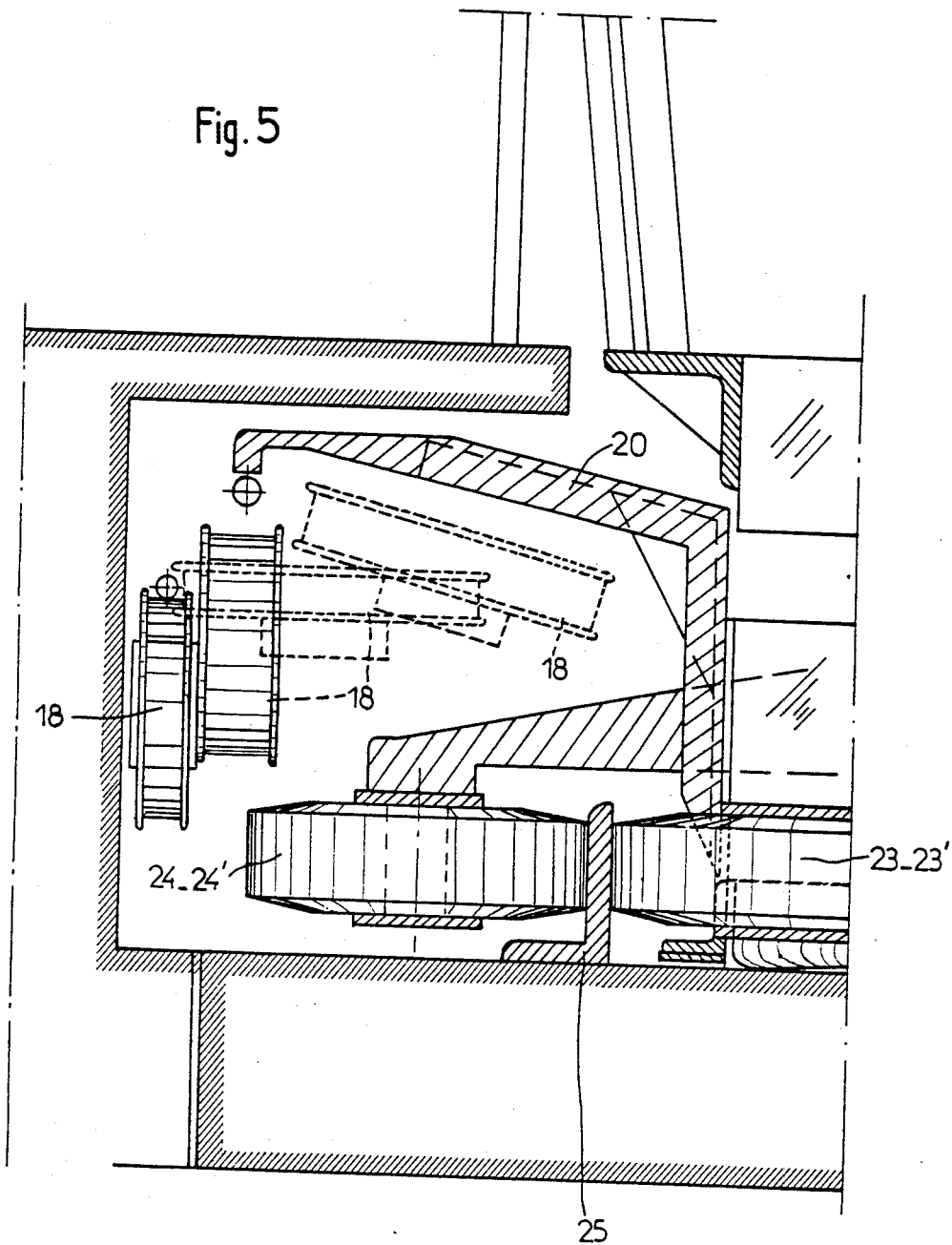

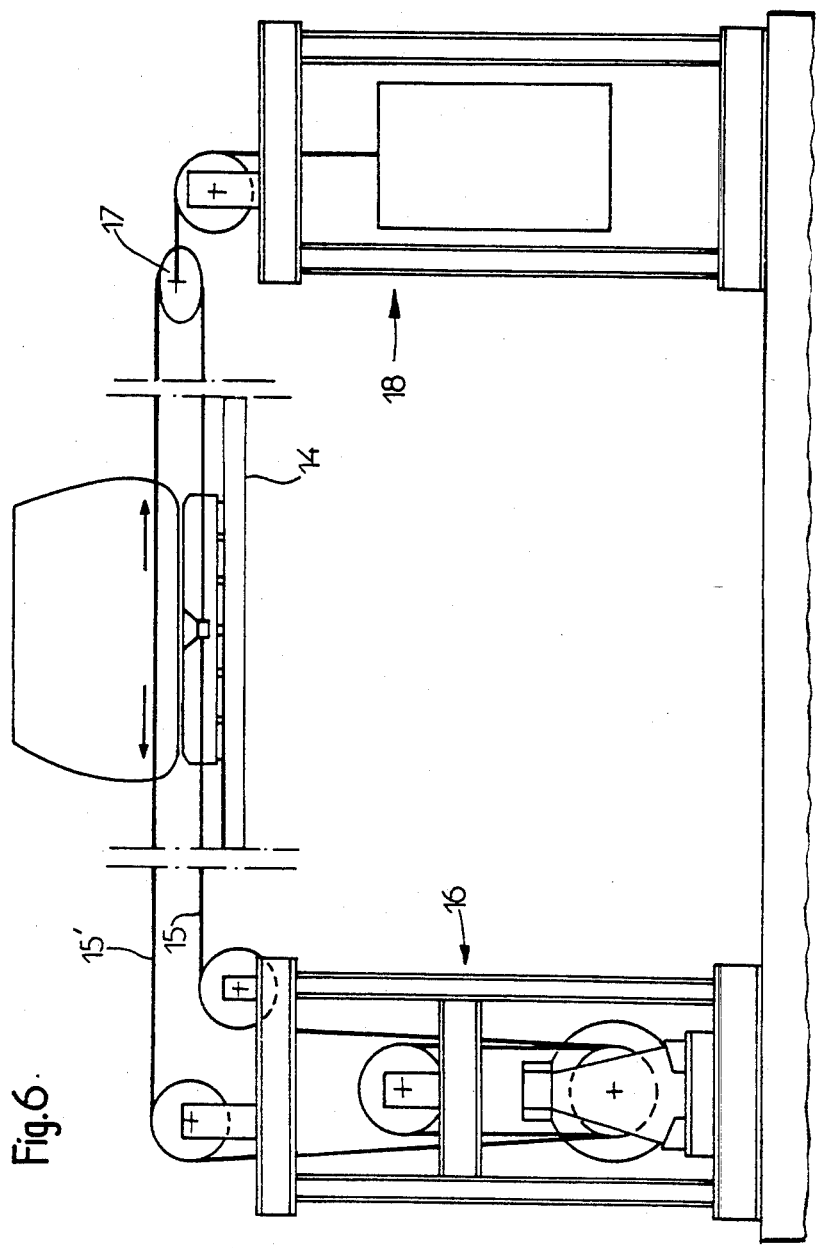

4,550,663

TRANSPORTATION SYSTEM HAVING A CABLE DRAWN VEHICLE

This is a continuation of application 349,890—filed Feb. 18, 1982—now abandoned.

TECHNICAL FIELD

This invention relates to transportation systems utilizing one or more passenger carrying vehicles or cabs which are drawn in a guideway by a cable.

BACKGROUND ART

One type of transportation system that propels a car with a closed loop cable is a mountain gondola. The cable in that system is continuously driven in one direction by a motor, and the motor is located at one end of the system. The gondola car that the passengers ride in is suspended from the cables, and the cables provide all vertical, horizontal and directional guidance and support to the car. The gondola system has a unique characteristic, mainly a result of the continuously moving cable: the car has to be disconnected from the cable and decelerated as it arrives at a terminal, so that the passengers can enter and leave the car. Furthermore, the car must be accelerated from a stop to the speed of the cable, then attached to it to put the car in the system. As with any other system having a continuously moving cable, the gondola system consequently contains complex, costly coupling equipment to couple and decouple the car and the cable and accelerate and decelerate the car. Generally speaking, this equipment includes an auxiliary drive of some sort containing a series of wheels that engage the car to accelerate it to a speed of the cable, and coupling equipment to connect the car to the cable once that speed is reached to provide smooth acceleration from a stop. Stopping the car involves roughly the same sequence, but in reverse: the car is detached from the cable and rides on rollers that slowly decelerate it to a stop.

In another related system passengers move in cars in a guideway. The cars are propelled back and forth in the guideway. They are connected to the same cable, and the cable passes around the guideway and is moved or pulled back and forth by a motor at one end of the guideway. As a result, the cars move synchronously (always move at the same time) in opposite directions, slowing down the system by making it impossible to individually control the cars.

DISCLOSURE OF INVENTION

The present invention provides a generally horizontal transportation system that moves passengers in closed cabs or vehicles between selected positions through the use of the cable, without the need for any complex and costly attachment equipment, such as that equipment found in gondola systems.

According to the invention, passengers are moved in a vehicle or cab in a guideway, and this guideway may be horizontal or even slightly inclined. A closed loop of cable or rope runs along one side of the guideway, and it has two opposite moving lengths, one that is attached to the vehicle to drive the vehicle back and forth along the length of the guideway. The cable is driven bidirectionally by an electric motor at one end of the guideway, and is controlled by supervisory equipment to control the stopping, starting, acceleration and speed of the cab.

Both cable lengths ride on rollers that are located along the outer perimeter edge of the guideway. An arm that extends from the vehicle to the outer perimeter connects to that cable which drives the vehicle. The guideway determines the general direction of the vehicle, and the cable provides the driving force for moving it in the guideway, but directional control is provided to the vehicle by a track that extends along the length of the guideway.

In straight sections of the guideway the rollers that support both lengths of the cable are primarily vertical to support the weight of the cable. But, in curved sections of the guideway, where the vehicle turns left or right, the particular roller that supports that length of cable that drives the vehicle is oriented slightly horizontal to accommodate the combined horizontal and vertical loads created in turns.

The invention may be extended to multiple vehicle systems; systems where each vehicle shares the same guideway. Such a system includes a transition point between the ends of the guideway, where the two vehicles separate, one moving left, one moving right, permitting them, when moving in opposite directions, to pass around each other to service opposite ends of the guideway. Each vehicle has its own closed loop, independent cable drive and the cables for each vehicle are supported on opposite sides of the guideway. The arrangement and location of the rollers adheres to the same design criteria for a single vehicle moving in the guideway, because the operation of the two vehicles is performed separately, except for sharing the same guideway, and coordinating their relative motions to provide service along the guideway.

According to another aspect of the invention, the vehicle may be constructed of multiple compartments, each riding on air cushions. These compartments are connected together through a hinge or pivot, thus suspending them independently. This permits them to follow the contour of the guideway and thereby avoid changes in lift characteristics that frequently result from minor variations in the contours of the guideway, and which can deteriorate system performance and produce premature mechanical wear on the air cushion by allowing the cushions to strike the guideway surface as the vehicle moves along.

A particular feature of the invention is that the location of the cables along the edge of the guideway puts them at a place where they cannot affect the lift characteristics of the air cushions, as they would if they were in the center of the guideway. This also makes it easier to place the guide rails in the guideway where they will not also affect the lift of the air cushions.

BRIEF DESCRIPTION OF THE DRAWING

FIG. 5 is an elevational view of the outer edge of a vehicle and the guideway portion immediately adjacent the vehicle in a system according to the invention; and FIG. 6 is a simplified schematic view of a system according to the present invention that contains a single vehicle supported on an air cushion.

BEST MODE FOR CARRYING OUT THE INVENTION

Figure 1:
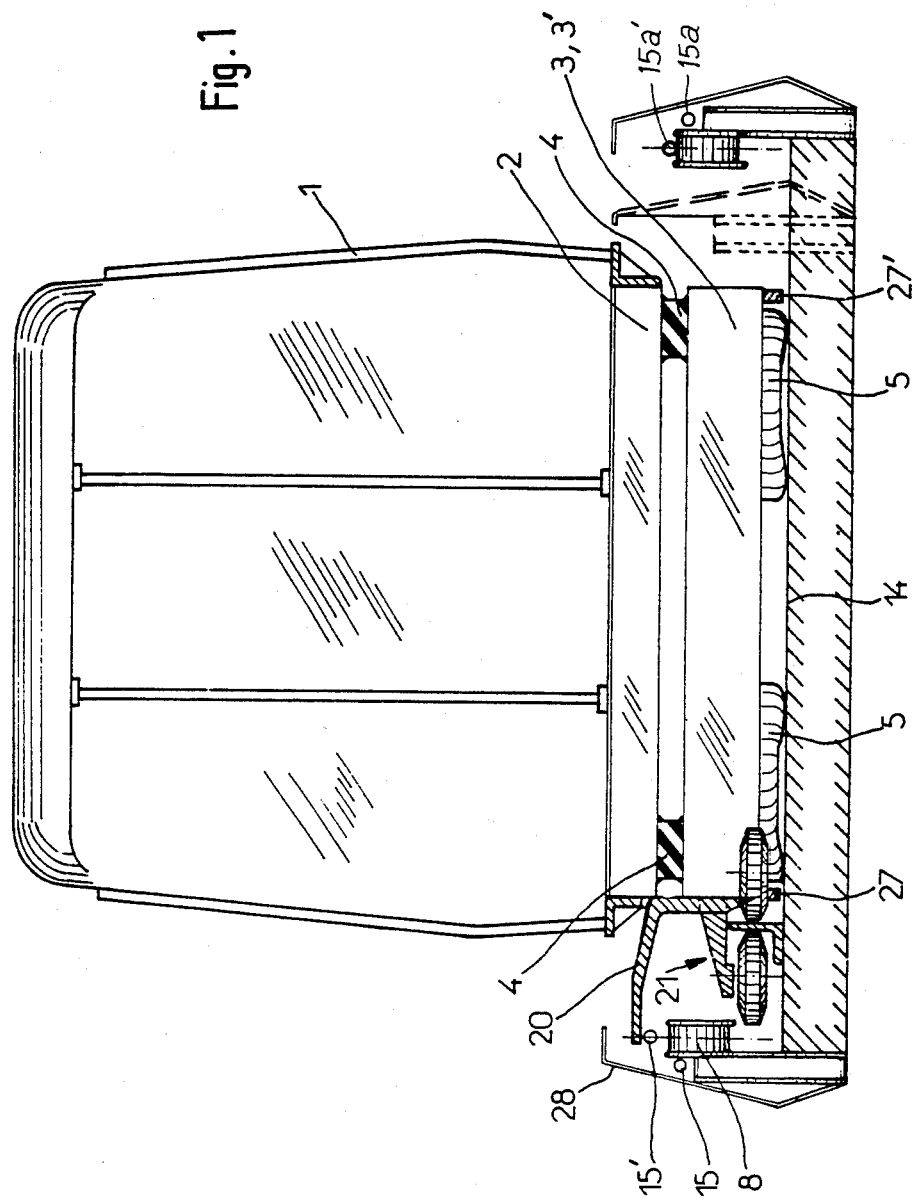
FIG. 1 is a cutaway vertical view of a vehicle suspended on air cushions in a guideway that is part of a system according to the present invention.

Referring to FIG. 1, a vehicle 1 is suspended in a guideway 14 on a plurality of air pads 5. Two cables 15, 15', which comprise a closed loop cable or rope, extend along the outer edge of the guideway 14 and between the ends of the guideway. As FIG. 6 shows, these cables pass around a sheave or pulley 17, on one end of the guideway, and are driven by a traction machine 16 at the other end. A counterweight 18 tensions the sheave 17, ensuring proper tension in the cables 15, 15'. The cables 15, 15' pass over a plurality of rollers 18, 18' that are placed along the inner wall of the guideway (see FIG. 5), and these provide vertical support to the cable along the guideway. The higher cable, 15', is connected to an arm 20 (preferably by a conventional cable clamp), and this arm, which is attached to the forward portion of the cab, extends from the outer edge of the vehicle to the cable.

In FIG. 5, the dotted lines for the rollers 18 show their positions in a curve or turn in the guideway, where the car goes left or right. There it will be seen that roller 18', the roller that supports the higher cable (the length connected to the cab), is not horizontal but at some angle to the horizontal, and this is done to provide the lateral support against the horizontal pull of the cable in the turns and vertical support against the consequent vertical pull and also the cable's weight.

Directional guidance is provided by an L-shaped track 25, and this track extends along the bottom of the guideway. The vehicle engages the track with pinch rollers 23, 24, and these are on opposite sides of the rail.

Figure 2:
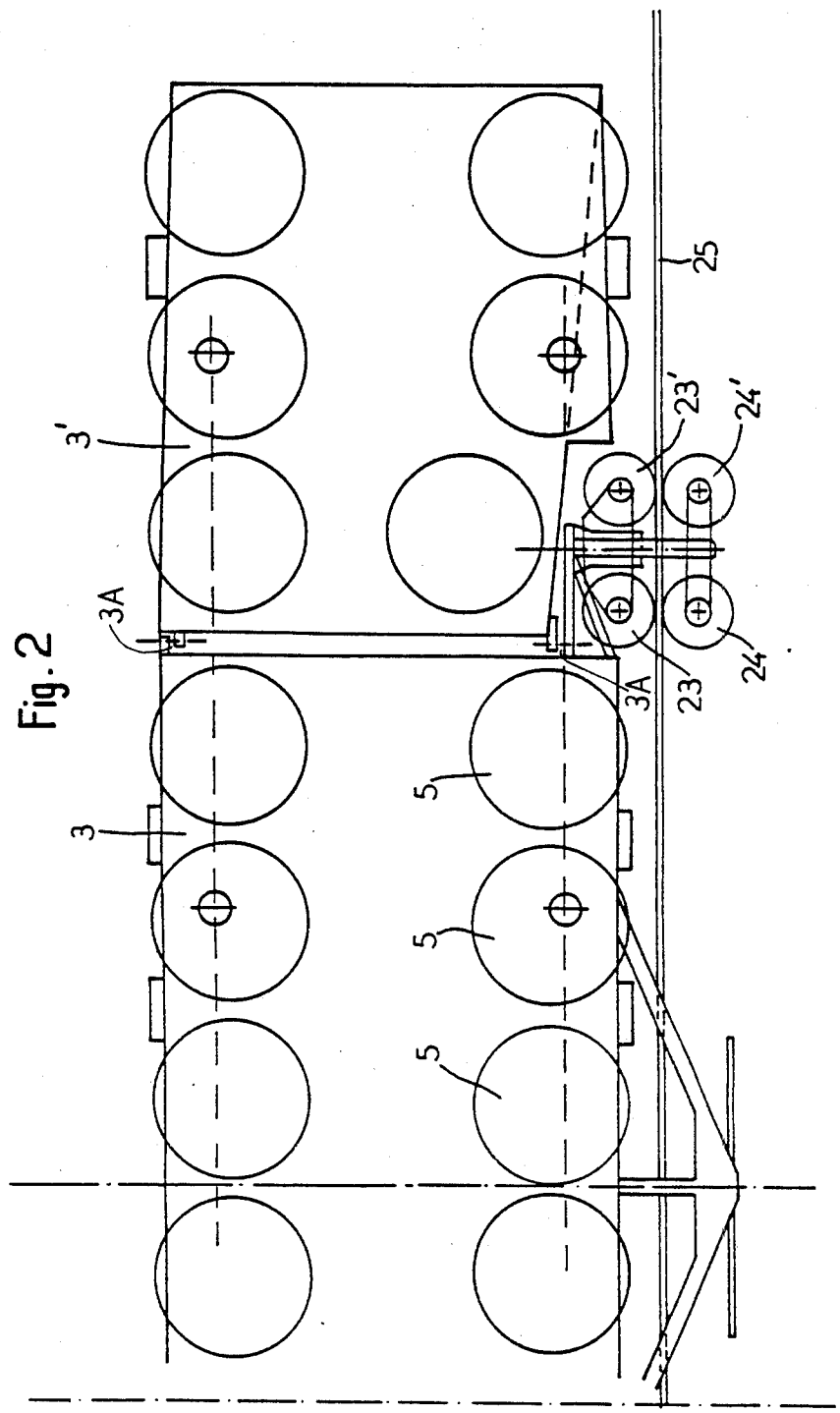
FIG. 2 is a simplified view of the bottom of the vehicle shown in FIG. 1, the vehicle comprising two connected cabs.
Figure 3:
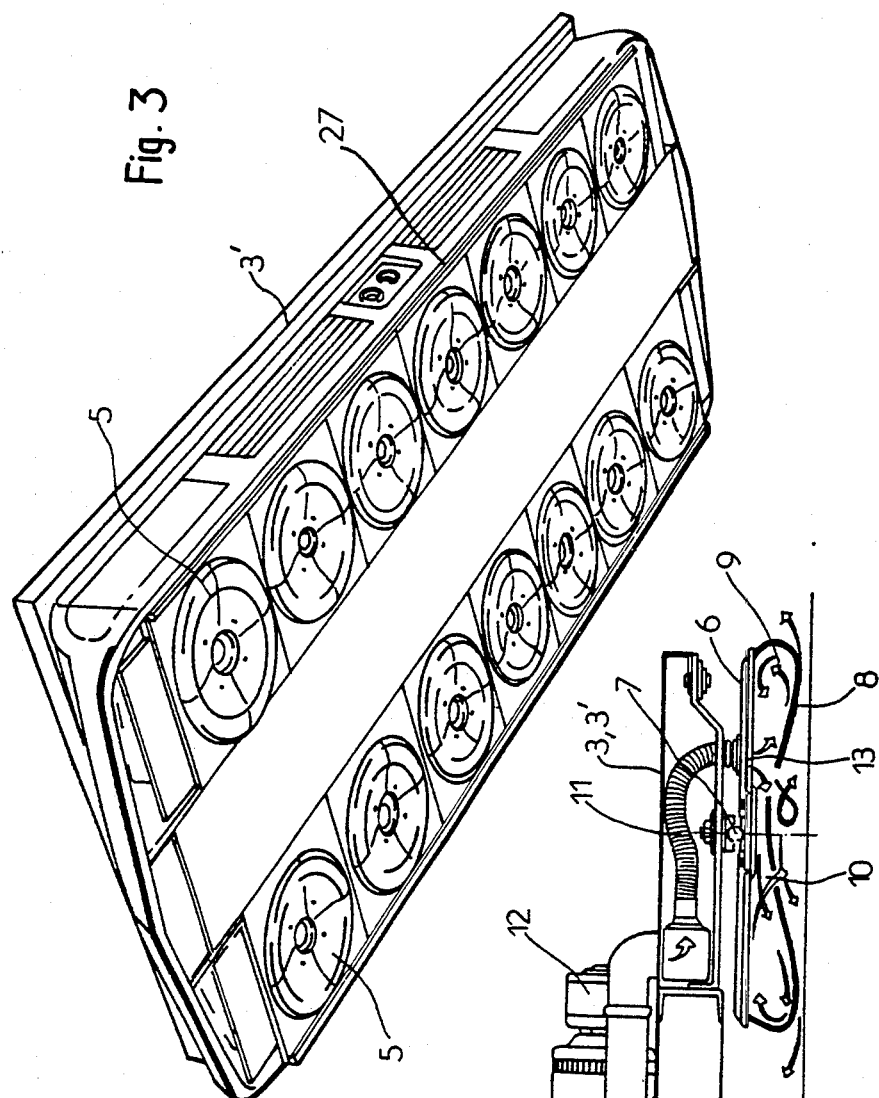
FIG. 3 is a perspective view of the bottom of one of these cabs.
Figure 4:
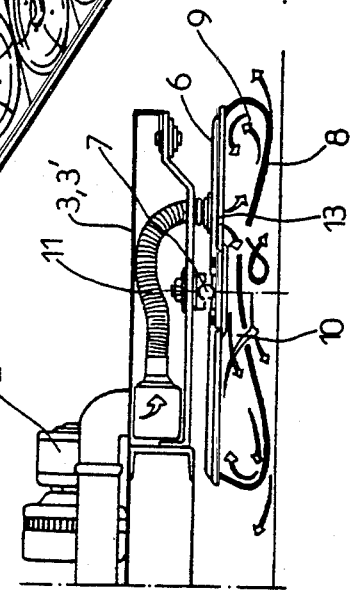
FIG. 4 is a schematic diagram of an air cushion system.

As FIG. 2 shows, the cab 5 may comprise two sections 3 and 3' connected by hinges 3A, and, each section rides on a plurality of air pads 5 that are located along the bottom of the cab. Such pads have been used in other systems and the construction operation of the air pads is well known. FIG. 4 shows a basic schematic diagram of a typical air pad system. It includes a blower motor 12 that pumps air through a conduit 11 into the air pad 5. This pad 5 includes outlets 10 along its bottom edge 8. The air exits from these outlets, creating a layer of air below the surface 8 and above the floor, and the layer of air (air cushion) is what supports the cab. Each of the cabs comprising the vehicle 1 may be suspended on the body by means of a buffer pad, such as an elastomer 4, to provide a soft ride.

FIG. 2 also shows that the arm 20 may have a triangular shape, as defined by three braces, two extending at an angle to the body of one of the cabs (preferably the larger one), and one, a central arm, extending perpendicular to the direction of travel. This arm 20 is attached to the front quarter of the vehicle, that being preferred.

In FIG. 1, on the right-hand side of the guideway 14 there are also another set of cables 15a', 15a. These extend along the other guideway wall, supported there in the same way by a pair of rollers at selected positions. These cables are attached to another cab (not shown), which is driven by an entirely separate and independent drive that is located at the other end of the guideway—opposite the drive described previously, and the drive arrangement for this second cab would also have the same components. In this "dual" vehicle system, there are cables along each side of the guideway, and both vehicles move in the same guideway 14, but by engaging opposite, entirely separate drive cables. The other vehicle (not shown in FIG. 1), in other words, would also have an arm 20 extending to the right, in order to engage its corresponding drive cable 15', which is on the other side of the guideway.

In the center portion (or at some other selected portion in the guideway between its ends) the guideway would split off into two sections, one going left, one going right, each of the cables following one section (as shown in French Pat. No. 2,460,821, which is a system, however, having only one cable and two connected cars, and where the cars thus move together at all times—whereas in this system they are entirely separate). Each vehicle would thus veer off through that section passing around the other vehicle. Thus, by using basically a single guideway and this "transition section", rapid service between terminal ends of the same guideway can be provided, and the cars can be independently controlled, since they have separate drives.

There are a number of possible variations to this system. One may embrace a vehicle that rides on a pair of rails on steel wheels, the direction of the rails providing the vehicle lateral guidance or steerage, much like a railroad train.

As another alternative, the vehicle may ride on rubber wheels that roll on rails; or these rubber wheels may ride in a recessed or wheel guideway track embedded in the floor of the guideway 14, the direction of that embedded guideway providing the directional guidance for the vehicle.

As another variation, the vehicle may ride on steerable wheels whose orientation guides the vehicle and is controlled by the direction of the track 25A. Those steerable wheels may be coupled by a pinch roller arrangement, similar to the one shown in FIG. 5, comprising the rollers 24—24' and 23—23'. The wheels, in following the rail, would thus steer the vehicle in the desired direction, determined by the rail.

In addition, other modifications, variations, in whole or in part, to the embodiment of the invention that has been described may be made by one skilled in the art, without departing from the true scope and spirit of the invention.

I claim:

1. A transportation system comprising:
   two vehicles pivotally attached about a horizontal axis for climbing articulation and having air cushion means underneath for suspending the vehicles by an air cushion effect;
   a guideway having a smooth, uninterrupted flat surface, defined as an air cushion effect area, upon which the air cushion effect operates;
   a motor-driven cable disposed in the guideway, outside of the air cushion effect area, for propelling the vehicles, wherein the cable is a closed loop, having a first part that propels the vehicles and a second part vertically displaced from the first part that travels in a direction opposite to the direction of the vehicles;
   an arm disposed on at least one of the vehicles for attaching to the cable;
   a rail disposed in the guideway, outside of the air cushion effect area, for guiding the vehicles;
   a pinch roller arrangement disposed on the vehicles, for engaging the rail; and
   wherein the cable is supported vertically by vertical sheaves in straight sections of the guideway and is supported both vertically and horizontally by inclined sheaves in curved sections of the guideway.

* * * * *